UNITED STATES PATENT OFFICE.

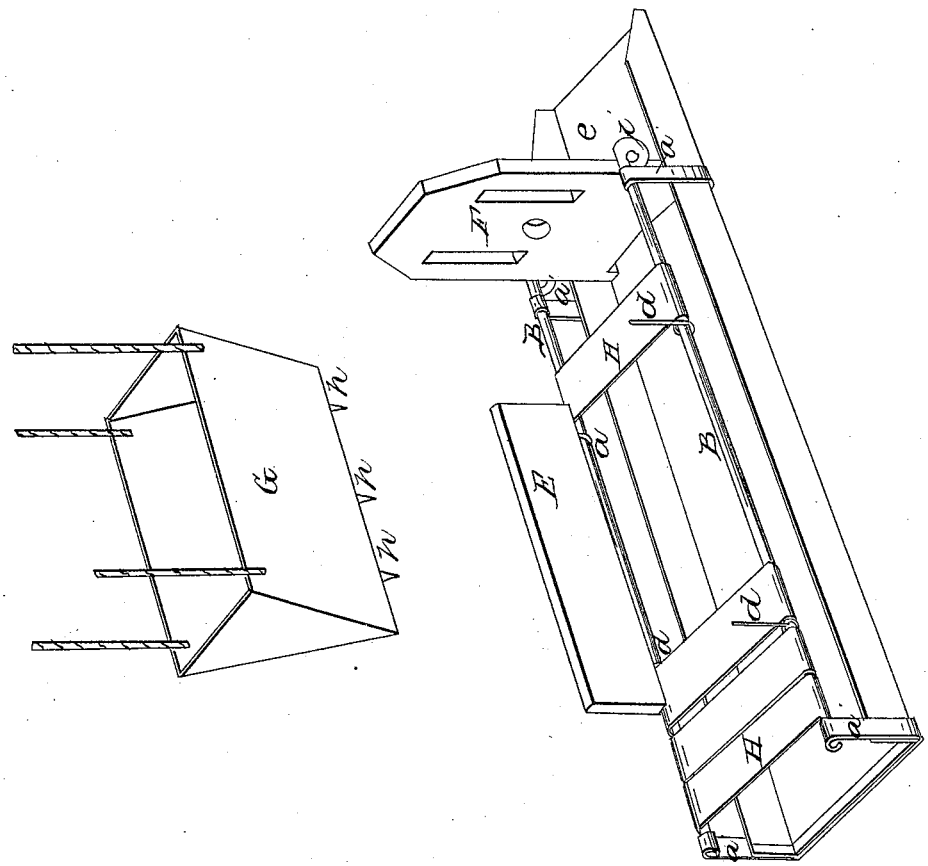

THOMAS C. BALL, OF SPRINGFIELD, VERMONT.

IMPROVEMENT IN VENTILATING APPARATUS FOR WOUNDED LIMBS.

Specification forming part of Letters Patent No. 39,453, dated August 4, 1863.

*To all whom it may concern:*

Be it known that I, THOMAS C. BALL, of Springfield, Windsor county and Sate of Vermont, have invented a new and useful Apparatus for Ventilating and Supporting Fractured, Wounded, and Amputated Limbs, which I call a "Ventilating-Trough;" and I do hereby declare that the following is a full and exact description thereof, reference being had to the accompanying drawings, and to the letters of reference marked thereon.

The nature of my invention consists in forming of any metallic or any other substance a trough consisting of a frame, which holds the trough proper firmly attached to it, and which support each other, and thus, while it supports the weight of the limb in and above it, allows a free ventilation of the limb, and at the same time conducts off any discharged matter, surplus water, or other liquid which may be used in dressing the wounded limb.

To enable others skilled in the art to make and use my invention, I will proceed to describe its construction and operation.

*a a a a*, as shown in the drawing, are a portion of the frame of the trough, which rests upon the bed or mattress, the ends being turned up at right angles, or nearly so, to receive the trough C, which fits into the angles so formed, and also to receive the rods B B, which run nearly the whole length of the trough.

C C is the trough formed with raised sides, and resting on the lower horizontal portion of *a*. The said sides are raised only high enough to form a trough for conducting off the liquids, as above mentioned. The rods B B are raised sufficiently high above the edges of the trough C to allow of a proper adjustment of the wounded limb, and also to allow a free circulation of air under it. The cloth or stays which support the limb are attached to said rods B B, as shown in the drawing, said stays being marked H, and being adjusted so as to support the weight of the limb and suit the nature of the case or condition of the wounded limb.

*d d d d* are adjustable hinges attached to and sliding on the rods B B, to support the sides of a fracture-box.

E in the drawing shows one side of the fracture-box attached, the other being left off. When the ventilating-trough is in use and the fracture-box is found to be not necessary, both sides may be detached.

F is an adjustable foot-rest, which is hung on pivots in its sides, and resting in holes or eyes *i i*, formed in the ends of the rods B B. These are stop-pins projecting from the sides of the trough, against which it rests when in use. It may be easily detached by springing the sides of the trough when not found necessary for the support of the foot.

G is a water-fountain suspended over the ventilating-trough, and *h h h h* are adjustable dripping-pins of wood, placed in holes in the bottom of the fountain G, so adjusted as to supply the proper quantity of water to the wounded limb.

I do not claim the foot-rest or the fracture-box or the water tank above described separately or in and of themselves as my invention, they having been long known and used. But What I do claim as my invention, and desire to secure by Letters Patent, is—

1. A ventilating-trough constructed of any suitable substance or materials, with rods or slats raised above the trough proper, to which are secured the bands or supports for the wounded limb to rest on, in the manner and for the purposes forth, or in any equivalent form.

2. In combination with said rods or slats, a fracture box, as set forth.

3. In combination with said rods or slats, a foot-rest, as set forth.

4. In combination with said trough proper and rods or slats, the water-fountain, as set forth.

5. In combination with the water-fountain, the dripping-pins, in the manner and for the purposes set forth.

THOS. C. BALL.

Witnesses:
DAN. ROWLAND,
H. N. TAFT.